(12) United States Patent
Cadwell

(10) Patent No.: US 7,072,521 B1
(45) Date of Patent: Jul. 4, 2006

(54) SYSTEM AND METHOD FOR THE COMPRESSION AND QUANTITATIVE MEASUREMENT OF MOVEMENT FROM SYNCHRONOUS VIDEO

(75) Inventor: John A. Cadwell, Richland, WA (US)

(73) Assignee: Cadwell Industries, Inc., Kennewick, WA (US)

( * ) Notice: Subject to any disclaimer, the term of this patent is extended or adjusted under 35 U.S.C. 154(b) by 579 days.

(21) Appl. No.: 09/885,288

(22) Filed: Jun. 19, 2001

Related U.S. Application Data

(60) Provisional application No. 60/213,083, filed on Jun. 19, 2000.

(51) Int. Cl.
*G06K 9/36* (2006.01)

(52) U.S. Cl. ...................... 382/251; 382/166

(58) Field of Classification Search ................ 382/166, 382/232, 236, 245, 251, 270
See application file for complete search history.

(56) References Cited

U.S. PATENT DOCUMENTS

| | | | |
|---|---|---|---|
| 4,262,306 A | | 4/1981 | Renner |
| 4,743,959 A * | | 5/1988 | Frederiksen ........... 375/240.25 |
| 4,914,508 A * | | 4/1990 | Music et al. ........... 375/240.01 |
| 5,107,845 A | | 4/1992 | Guern et al. |
| 5,438,989 A * | | 8/1995 | Hochman et al. ........... 600/426 |
| 5,544,286 A * | | 8/1996 | Laney ........................ 358/1.15 |
| 5,602,585 A | | 2/1997 | Dickinson et al. |
| 5,625,759 A * | | 4/1997 | Freeman .................... 358/1.15 |
| 5,648,815 A | | 7/1997 | Toba |
| 5,664,029 A * | | 9/1997 | Callahan et al. ............ 382/260 |
| 5,684,887 A | | 11/1997 | Lee et al. |
| 5,847,755 A | | 12/1998 | Wixson et al. |
| 5,930,379 A | | 7/1999 | Rehg et al. |
| 6,026,180 A * | | 2/2000 | Wittenstein et al. ........ 382/166 |
| 6,062,216 A | | 5/2000 | Corn |
| 6,373,890 B1 * | | 4/2002 | Freeman .................... 375/240 |

* cited by examiner

*Primary Examiner*—Daniel Miriam
(74) *Attorney, Agent, or Firm*—Christensen O'Connor Johnson Kindness PLLC

(57) ABSTRACT

A system and method for optimizing and quantifying movement in synchronous video are provided. An image-processing computer obtains a synchronous video image, which is converted to color bitmap frames. Each frame is then sub-divided into smaller pixel blocks. Processed independently, the size of each pixel block is reduced by truncation of the color resolution and the use of a limited color table for the pixel block. The cumulative color difference in the pixel block is calculated and if it is below a threshold, the pixel block data will not be saved. Alternatively, the pixel block data is compressed and saved. Upon decoding, the color difference between each pixel and the same pixel in the preceding frame is compared. The color difference is assigned a pseudocolor and is displayed on the screen. Larger color differences are represented with more pronounced pseudocolors.

33 Claims, 10 Drawing Sheets

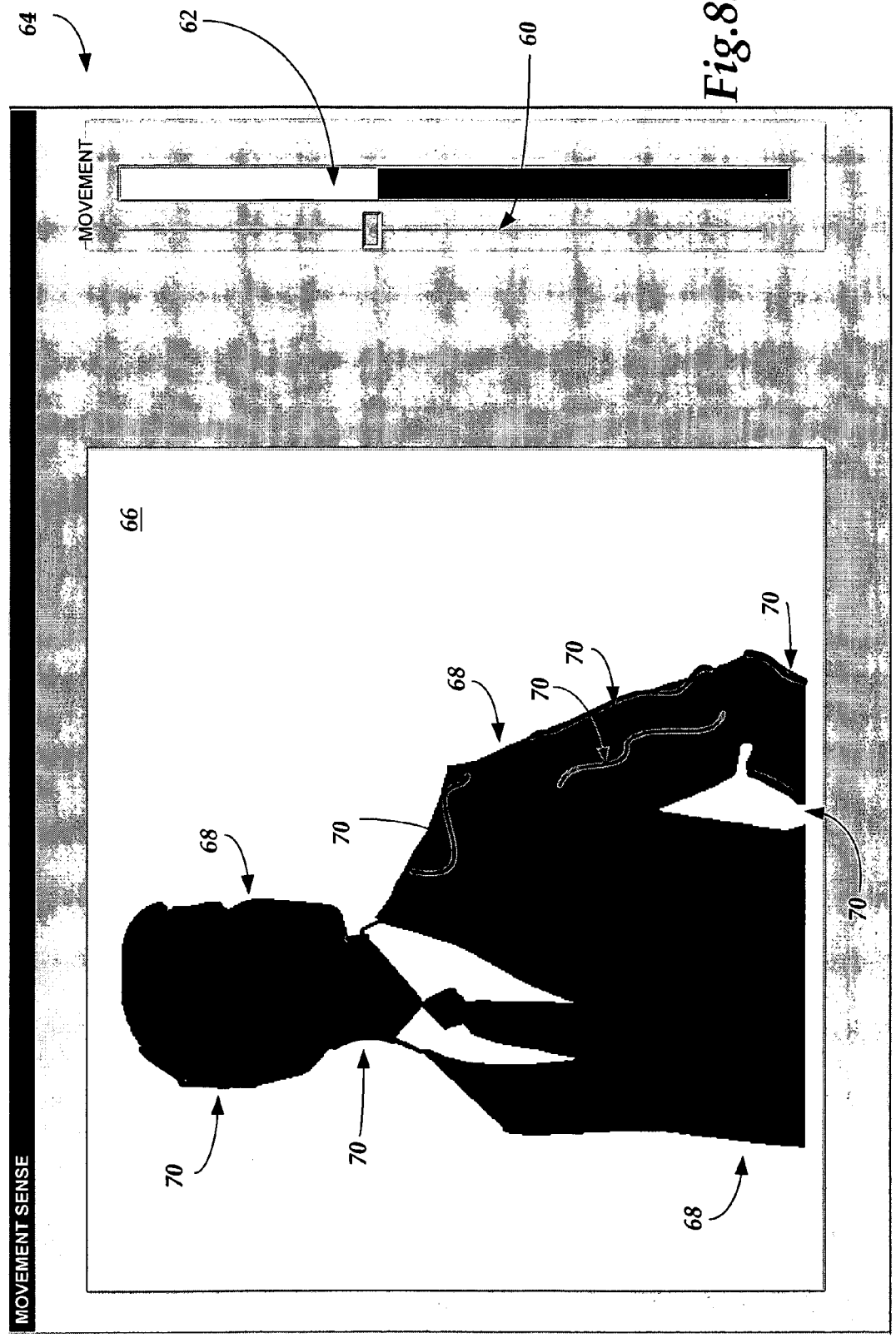

SYSTEM AND METHOD FOR THE COMPRESSION AND QUANTITATIVE MEASUREMENT OF MOVEMENT FROM SYNCHRONOUS VIDEO

CROSS-REFERENCE TO RELATED APPLICATION

This application claims the benefit of U.S. Provisional Application No. 60/213,083, filed Jun. 19, 2000, which is hereby incorporated by reference.

FIELD OF THE INVENTION

The present application relates to computer software, and in particular, to a system and method for compressing and quantifying movement in synchronous video.

BACKGROUND OF THE INVENTION

The production and storage of images in synchronous digital video provide potential advantages over other ways of recording images, such as conventional analog video images stored on magnetic tape for display on television sets (e.g., VCR tape). For example, digital video images permit a user to scan and access specific time frames within the video with a minimal amount of access time. In conjunction with computing systems having suitable processing and storage facilities, the use of synchronous digital video becomes a practical medium for a variety of applications.

One specific application of synchronous digital video involves measuring and/or monitoring movement of objects within video images. For example, when a patient undergoes an electroencephalogram ("EEG"), a testing facility is generally interested in acquiring a sufficient amount of data to detect and quantify the amount of movement by the patient (in terms of how much and for how long). Often, each monitoring period lasts over several hours and a single patient may undergo multiple EEG tests within a period of a few weeks.

Some testing facilities utilize digital video to record the patient over the entire monitoring period, and then use the scanning features of the digital video to pass through any extended periods of patient inactivity. Generally, the testing facility must balance the quality/quantity of the video data with the financial burden of collecting data in terms of the amount of memory required to capture and store video images. For example, a sleeping patient being monitored throughout an entire night (approximately a period of eight hours) may only produce minutes of detectable movement throughout the entire eight hours. Requiring the testing facility to record and maintain the entire eight-hour synchronous video becomes resource depleting and an inefficient use of typically expensive computing resources, especially if this type of testing is repeated often and conducted on a large patient group.

To alleviate the resource consuming deficiency associated with synchronous digital video images, various digital video formatting methods are utilized to reduce the amount of data required to store and recreate video images. One example of a compression-type video formatting method is the Motion Picture Engineering Group ("MPEG") video format. In accordance with the MPEG format, a continuous video image is broken down into a number of successive still video frames over a given time period. Additionally, the MPEG formatting method is configured such that the data packet size required to generate each of these successive frames is approximately equal. One skilled in the relevant art will appreciate that most compression techniques, such as the MPEG format, are lossy in that the restored image is an imperfect copy of the original. Additionally, most compression techniques introduce some type of artifacts whose character and severity may be controlled by modifying the type and degree of compression.

One approach utilized by lossy compression techniques, such as the MPEG formatting method, involves reducing the amount of data necessary to create a successive frame by varying the amount of detail information utilized to create each video frame. One skilled in the relevant art will appreciate that the amount of detail information utilized to generate each frame is directly related to the amount of change the current frame will display as compared to the preceding frame. For example, if a current frame of data is different from the preceding frame, it is assumed that the current frame will require a greater amount of data to be generated. Accordingly, under this approach, the amount of data used to generate detail in the current frame is reduced to maintain the constant sized data packets. However, because a change in subsequent frames implies movement within the video image, the reduced frame resolution by the loss of detail information is typically unnoticeable (or at least acceptable) to the human eye.

Another approach utilized by lossy compression techniques involves reducing the amount of data necessary to create and store by capturing and storing only the difference between the successive frames if the two images within the frames are considered to be substantially similar. For example, if only a small percentage of a frame of digital data is changed from the previous frame, only the pixel data that has changed will be transmitted. Thus, this approach mitigates the amount of the data transferred by eliminating the transmission of non-changing pixel data.

Although conventional lossy video image compression formats, such as the MPEG video format, attempt to reduce the amount of data required to store and recreate synchronous video images, these conventional formats are not well suited for specific application to the detection and quantification of movement over extended periods of time while maintaining smaller sized data files. With reference to the use of video data to conduct an EEG procedure on a patient, the necessary quality of images required to monitor movement under the MPEG formatting method creates approximately one gigabyte of data per hour. Considering that a single patient generates approximately eight hours of data per test period, use of the MPEG format would quickly consume large quantities of testing facility processing and memory storage resources. Moreover, the MPEG format does not provide any quantification or measurement of the amount of movement with the video image.

Accordingly, there is a need for a method and system that provides variable compression data rates as a function of the amount of movement between successive frames of a video image. Additionally, there is a need for a method and system for detecting and quantifying movement within a synchronous video image.

SUMMARY OF THE INVENTION

A system and method for optimizing and quantifying movement in synchronous video are provided. An image-processing computer obtains a synchronous video image that is converted to color bitmap frames. Each frame is then sub-divided into smaller pixel blocks. Processed independently, the size of each pixel block is reduced by truncation of the color resolution and the use of a limited color table for the pixel block. The cumulative color difference in the pixel block is calculated and if it is below a threshold, the pixel block data will not be saved. Alternatively, the pixel block data is compressed and saved. Upon decoding, the color difference between each pixel and the same pixel in the preceding frame is compared. The color difference is assigned a pseudocolor and is displayed on the screen. Larger color differences are represented with more pronounced pseudocolors.

In an aspect of the present invention, a method for processing movement data in synchronous video is provided. A video processing computing device obtains a first frame of digital data corresponding to a digital image. The video processing computing device generates a color-table for the first frame of the digital data that corresponds to at least one pixel color contained within the first frame and maps the first frame of digital data according to the color-table. The video processing computing device obtains a preceding frame of digital data corresponding to the digital image and generates a cumulative color difference between the first and the preceding frames of the digital data. The video processing computing device updates a frame data if the cumulative difference is above a difference threshold. The frame data is operable to regenerate the first frame of the digital data.

In accordance with another aspect of the present invention, a method for processing movement data in synchronous video is provided. A video processing computing device obtains a first frame and second frame of digital data. The second frame of digital data is representative of a time preceding the first frame of digital data. The video processing computing device compares the cumulative color difference between the first and second frames of digital data and maps the cumulative color difference according to a pseudocolor scale. The video processing computer displays a resulting frame of digital data.

In accordance with a further aspect of the present invention, a computer-readable medium having a synchronous video compression module is provided. The synchronous video compression module is operable to obtain a first and second frame of digital data and generate a compressed frame data. The compressed frame data is configured to include any cumulative color difference below a compression threshold.

In accordance with yet another aspect of the present invention, a method for processing movement data in synchronous video utilizing a computer system having a graphical user interface including a display and a user interface selection device is provided. The computer system displays a data frame size indicator indicative of a size of a data frame inputted to the computer system. The computer system also displays a movement threshold interface component operable to be manipulated by the user interface selection device to modify a movement threshold. The value of the movement threshold corresponds to the size of the data frame.

In accordance with still a further aspect of the present invention, a method for processing movement data in synchronous video utilizing a computer system having a graphical user interface including a display and a user interface selection device is provided. The computer system displays a frame of digital data that corresponds to the processing of a first and second frame of raw video data such that the cumulative color difference is displayed according to a pseudocolor in the frame of digital data.

In accordance with yet another aspect of the present invention, a method for processing movement data in synchronous video is provided. A video processing computing device obtains a first frame of digital data corresponding to a digital image and subdivides the first frame of the digital data into two or more pixel blocks. The video processing computing device generates a color table corresponding to at least one color contained within each pixel block for each pixel block in the first frame of the digital data, the color table and maps each pixel within the pixel block according to the color table. The video processing device obtains a preceding frame of digital data corresponding to the digital image and generates a cumulative color difference between each pixel block in the first frame of data and a pixel block in the preceding frame of the digital data. The video processing computing device updates a frame data if the cumulative color difference between each pixel block is above a different threshold. The frame data is operable to regenerate the first frame of the digital data.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is an enlarged view of the screen display of FIG. 7 illustrating an exemplary pseudocolor display generated by the video display component of the image-processing computer of FIG. 2.

DETAILED DESCRIPTION OF THE PREFERRED EMBODIMENT

The present application is directed to a system and method for compressing and capturing movement from synchronous video. Specifically, the present invention will be described in relation to a computer system 10 for processing the synchronous video data. One skilled in the relevant art will appreciate that the system disclosed is illustrative in nature and should not be construed as limiting.

Figure 1:
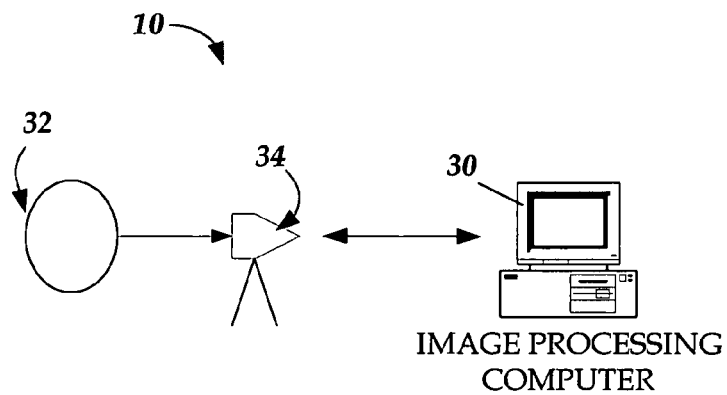
FIG. 1 is a block diagram showing an illustrative operating environment for implementing aspects of the present invention.

Referring now to FIG. 1, in an actual embodiment of the present invention, the system 10 is embodied in a standalone configuration including an image-processing computer 30. The image-processing computer 30 captures a video image 32 with a connected device, such as a video camera 34, and processes the image in accordance with the present invention. As illustrated in FIG. 1, the video camera 34 is directly connected to the image processing computer 30. One skilled in the relevant art will appreciate that the image-processing computer 30 may be connected to more than one video cameras 34. Moreover, the video cameras 34 may be remote from one another or from the image-processing computer 30, and may communicate with other components such as by wide area networks (WANs) and/or local area networks (LANs).

Figure 2:
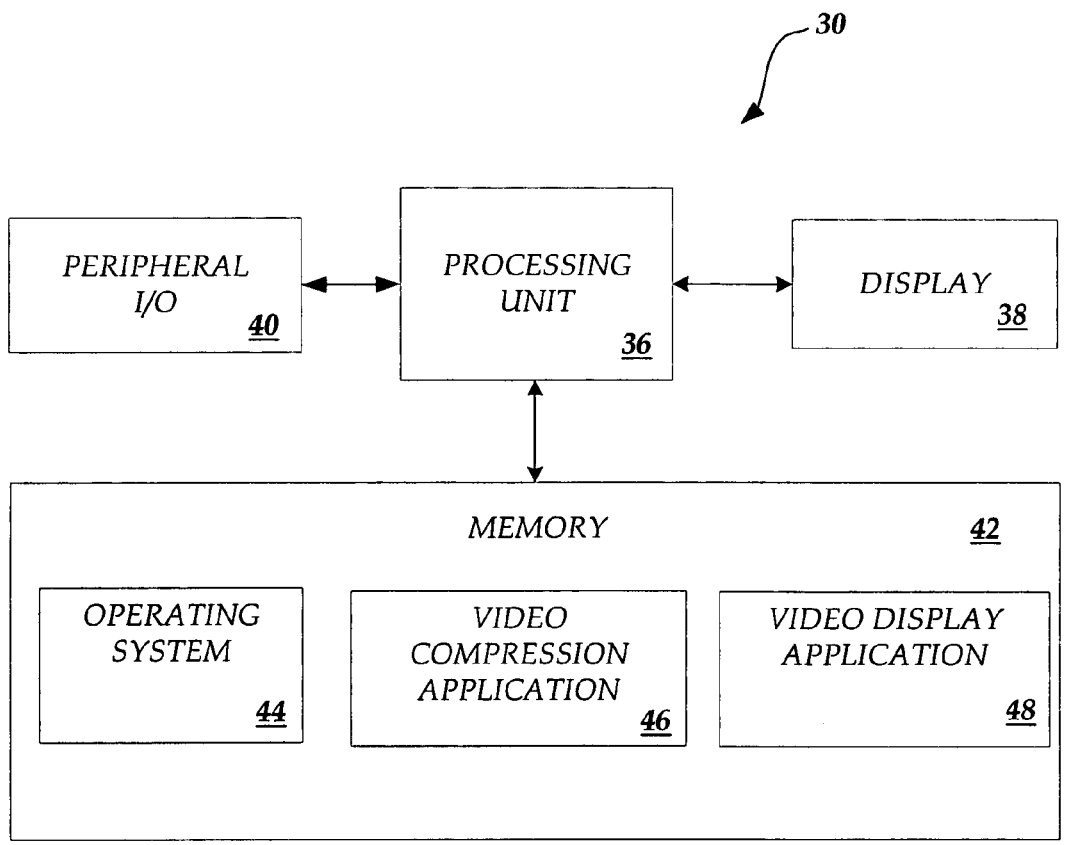
FIG. 2 is a block diagram depicting an illustrative architecture for an image-processing computer in accordance with the present invention.

FIG. 2 depicts several of the key components of an illustrative image-processing computer 30. Those of ordinary skill in the art will appreciate that the image-processing computer 30 includes many more components than those shown in FIG. 2. However, it is not necessary that all of these generally conventional components be shown in order to disclose an illustrative embodiment of the invention.

As shown in FIG. 2, image-processing computer 30 includes a processing unit 36, a display 38, a peripheral input/output 40 and a memory 42. As applied to the present invention, the peripheral input/output 40 may accept inputs from a variety of devices connected to the image-processing computer 30 including, but not limited to, digital still cameras, digital video cameras, video cassette players, DVD players, non-digital video cameras and the like. As an illustrative embodiment of the present invention, the image-processing computer 30 may also include additional components such as modems or network interfaces for communication with various devices.

The memory 42 generally comprises a random access memory ("RAM"), a read-only memory ("ROM") and a permanent mass storage device, such as a disk drive. The memory 42 stores an operating system 44 for controlling the operation of the image-processing computer 30. The memory 42 also stores program code for implementing monitoring and quantifying movement within a digital video image. Specifically, the memory 42 includes a video compression software application 46 and a video display software application 48 formed in accordance with the present invention.

It will be appreciated that memory components may be stored on a computer-readable medium, such as a floppy, CD-ROM or DVD-ROM drive, and loaded into the memory 42 of the image-processing computer 30 using a drive mechanism associated with the computer-readable medium. The memory 42, display 38, and peripheral input/output 40 are all connected to the processing unit 36 via one or more buses. As will be generally understood by those skilled in the are and others, other peripherals may also be connected to the processing unit 36 in a similar manner. Moreover, although the image-processing computer 30 has been described with relation to two components for implementing the measurement and quantification process of the present invention, incorporation of an alternative number of components is within the scope of the present invention.

In an aspect of the present invention, a method and system for compressing video data are provided, Specifically, in accordance with an illustrative embodiment of the present invention, a method and system for compressing synchronous video data utilizing cumulative color differences between successive video frames are provided.

Figure 3A:
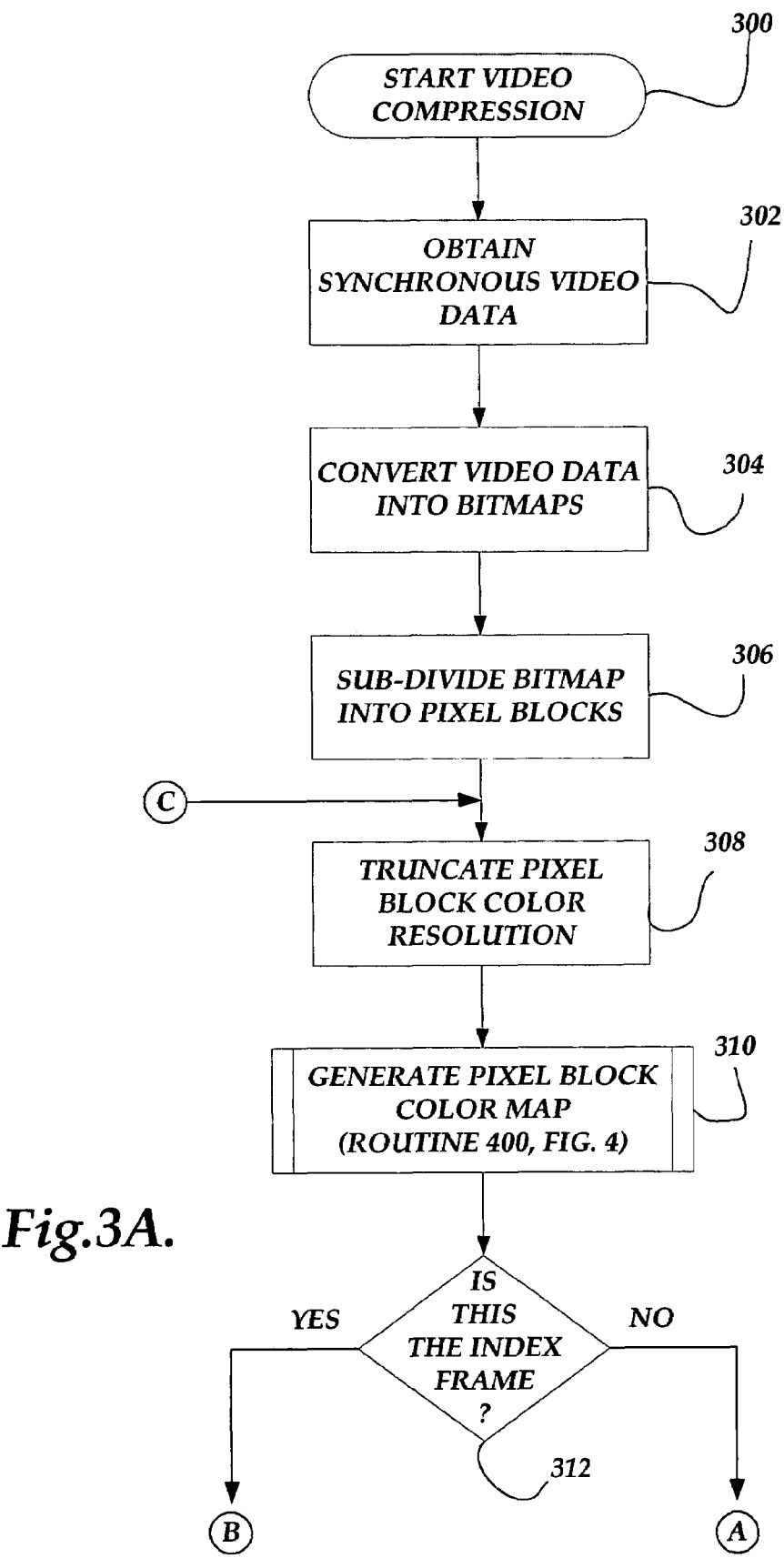
FIGS. 3A, 3B and 3C are flow diagrams illustrative of a routine implemented by the image-processing computer of FIG. 2 for compressing video image data.
Figure 3B:
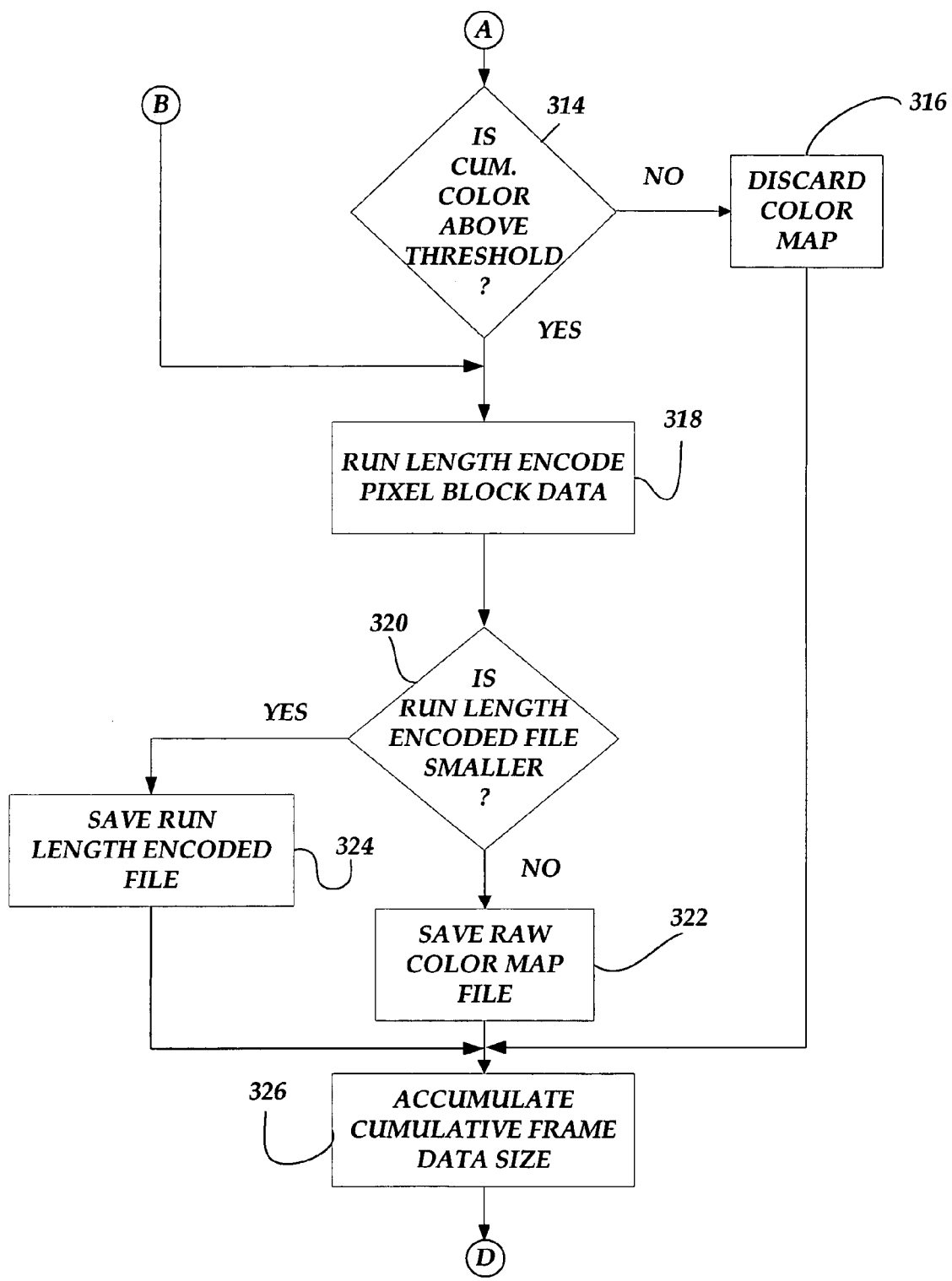
Figure 3C:
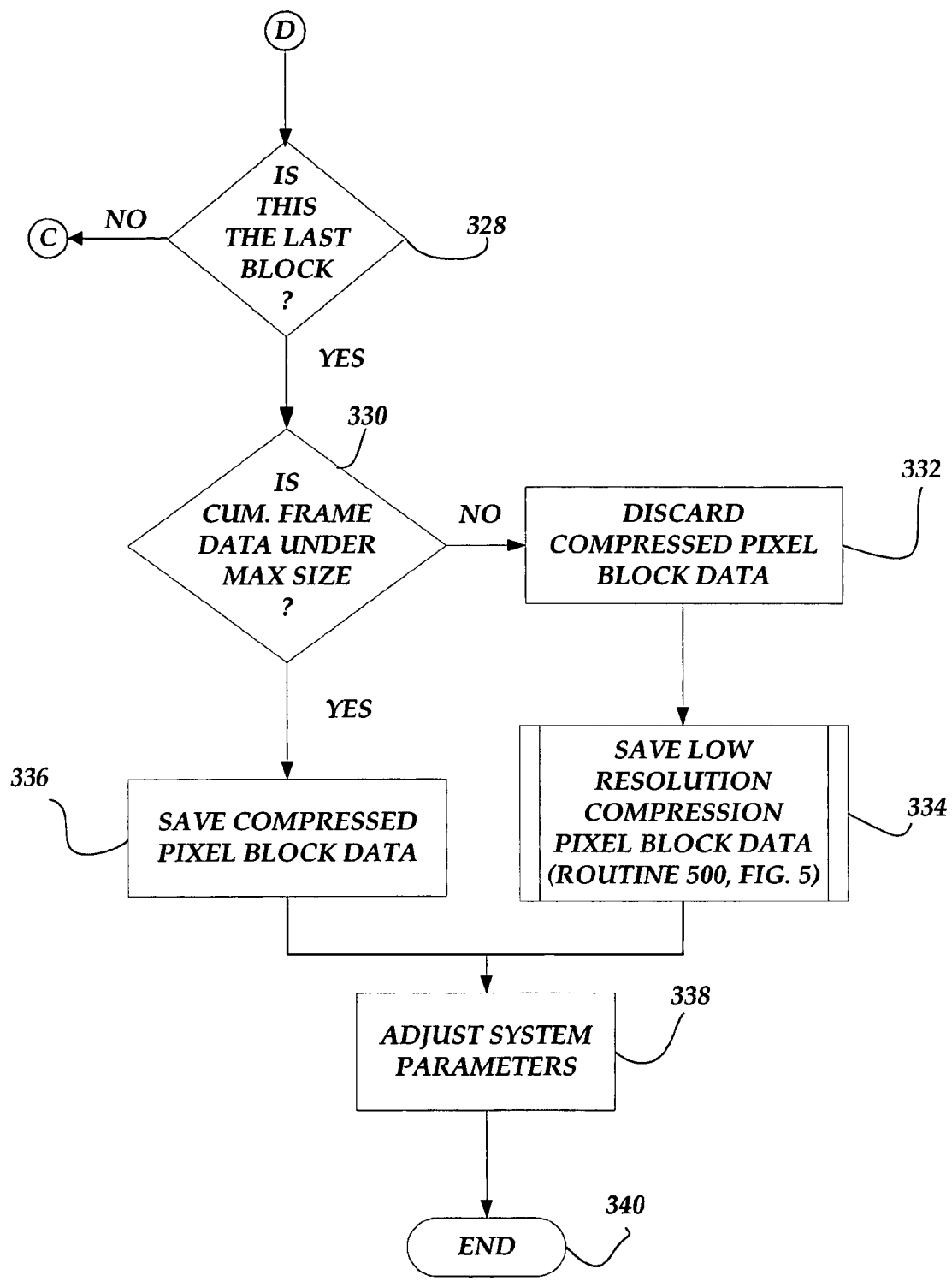

FIGS. 3A, 3B and 3C illustrate a video compression routine 300 performed by the video compression application 46 of the image-processing computer 30, in accordance with the present invention. With reference to FIG. 3A, the routine 300 begins at block 302 when the video compression application 46 obtains video image data 32. In an actual embodiment, the video compression application 46 obtains the video image data 32 from a digital video camera 34 connected directly to the image-processing computer 30. That is, as would be understood, and as illustrated in FIG. 1 and previously described, the video image 32 may be obtained in a variety of manners from a variety of sources. At block 304, the video compression application 46 converts the digital image into successive video frames suitable for processing.

In an illustrative embodiment of the invention, each frame of the digital video image is represented by a bitmap. As is generally understood, a bitmap is a map, or table, of data defining the characteristics of one or more pixels of a computer display. For color images, the bitmap includes data defining a characteristic of each pixel for each color on the display. For example, in a display utilizing a red, green, and blue ("RGB") color configuration, a bitmap contains a characteristic red, green, and blue value for each pixel in the array. The number of bits in the bitmap utilized to define the characteristic values of each pixel is commonly referred to as "color resolution" or "color depth."

In an actual embodiment of the invention, a display area within the image-processing computer 30 display screen is defined by a 320 pixel by 240 pixel array. Additionally, each pixel in the array is characterized by a 24-bit RGB color depth (e.g., 8 bits per color). As will be readily understood by one skilled in the relevant art, various methods and systems for the capture of video images for incorporation into a computer system are known. As will be further understood, alternative sized pixel arrays and bitmap configurations are within the scope of the present invention.

After a video image display frame is converted into a RGB bitmap at block 304, the video compression application 46 partitions the bitmap into multiple, smaller blocks at block 306. By way of an example, the bitmap may be divided into a grid of square 16 by 16 pixel blocks, organized 20 blocks across and 15 blocks high. Each 16 by 16 pixel block is defined by 256 individual display pixels.

At this point in the routine 300, the video compression application 46 begins an iterative process of processing each pixel block individually. Specifically, at block 306, the video compression application 46 truncates one or more of the least significant bits of the pixel block's color resolution to reduce the total amount of color resolution data in the pixel block. In an actual embodiment of the invention, the video compression application 46 truncates the three least significant bits of each 8-bit color representation. Accordingly, each color attribute is now defined by a 5-bit representation, which reduces the total length of the color resolution from a 24-bit length to a 15-bit length. As will be generally understood by those skilled in the art, the number of bits truncated at block 306 is a function of the desired amount of data reduction versus the amount of resolution allowed for each color. As will be further understood, the elimination of the truncation step at block 306 or the truncation of a different number of bits of the color resolution are within the scope of the present invention.

Figure 4:
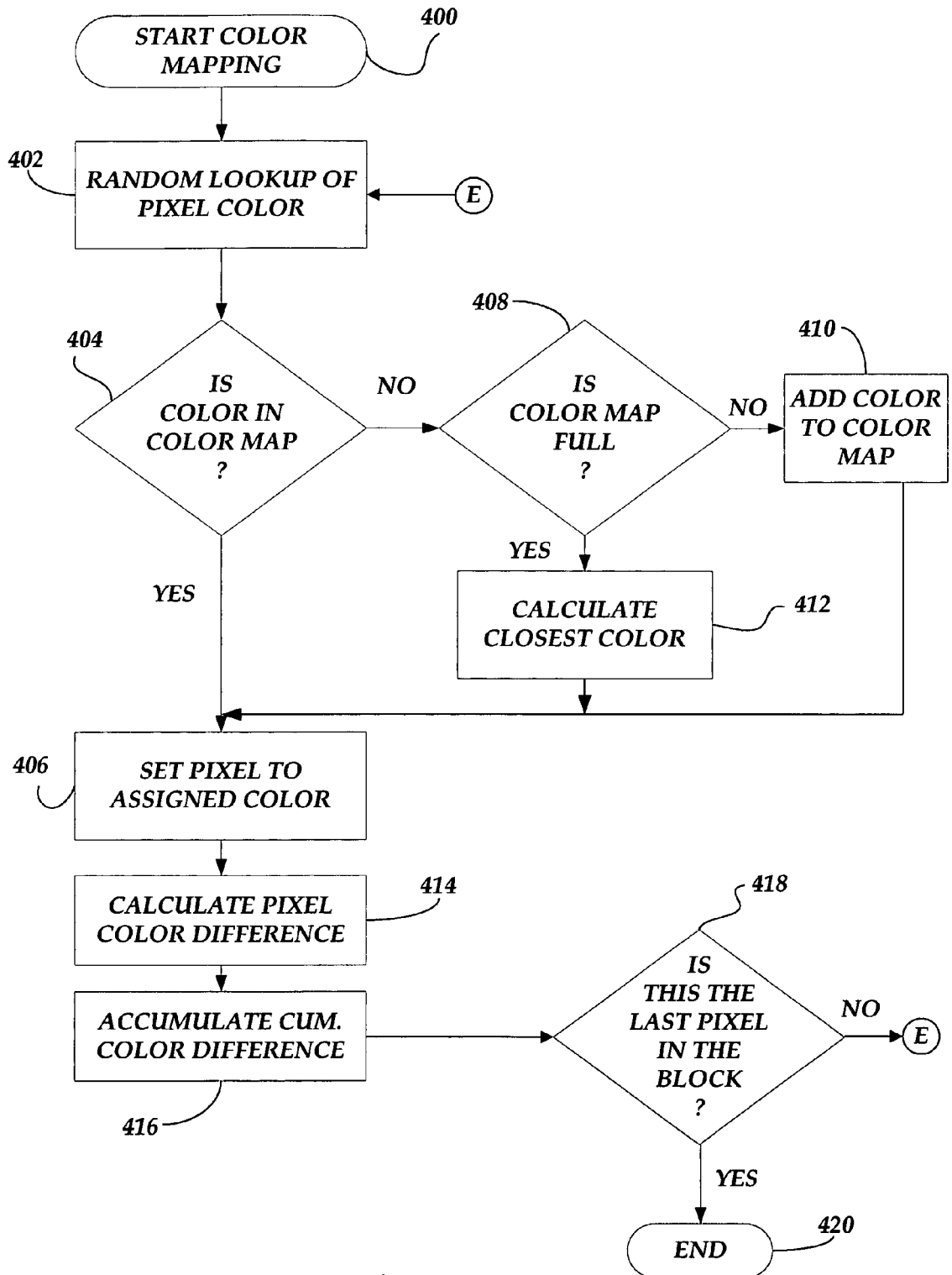
FIG. 4 is a flow diagram illustrative of a subroutine implemented by the image-processing computer of FIG. 2 for implementing a pixel block color mapping in accordance with the present invention.

After the length of the color resolution has been reduced at block 308, the video compression application 46 generates a color map for the pixel block at block 310. FIG. 4 is representative of a subroutine 400 suitable for implementation by the video compression application 46 to create a color map for each pixel block. At block 402, the video compression application 46 randomly selects one of the pixels within the pixel block to determine its specific color. In an actual embodiment, a random lookup is utilized to prevent skewing of an image, as may occur from a sequential scan of the pixel colors (e.g., right to left). Alternatively, one or more sequential pixel color scans may be utilized.

At decision block 404, a test is made to determine whether the actual color of the pixel matches a color in the pixel block's color map. In an illustrative embodiment of the invention, each pixel's color after processing will be defined by one of a predetermined number (e.g., 16) colors stored in the pixel block color map. As will be understood, the number of colors selected to define each pixel block is a balance of resolution of screen display and data size. If at decision block 404 the pixel's actual color matches (within a threshold) one of the colors in the color map, at block 406, the pixel is set with the color map index corresponding to the matched color. However, if at decision block 404 the pixel's actual color does not match one of the colors in the color map, at decision block 408, a test is made to determine whether the color map is full. In an actual embodiment of the invention, the color map is not full if there are less than 16 defined colors in the color map. If the pixel block color map is not full, at block 410 the pixel's color configuration is added to the pixel block color map and the pixel is set with index of the color, as now stored in the color map, at block 406.

If at block 408 the color map is full, the closest color to the pixel's actual color is determined at block 412. In an illustrative embodiment of the invention, the determination of the closest color to the pixel's actual color is accomplished by analyzing the cumulative color difference between the pixel's color configuration and the color configuration for each of the colors in the color map. Specifically, and as applied to a RGB bitmap, to calculate the cumulative color difference, the absolute difference between the pixel's actual red value and the red value of the color in the color is calculated. The process is then repeated for the green and blue values as well. The cumulative color difference between two pixels becomes the sum total of the differences between each color in the color configuration. The calculation of the difference can also be stated by Equation (1):

$$RGB_\Delta = \text{absolute}(red_{pixel} - red_{map}) + \text{absolute}(green_{pixel} - green_{map}) + \text{absolute}(blue_{pixel} - blue_{map}) \quad (1)$$

After the closest color is determined at block 412, the pixel is set with that color's color map index at block 406.

At block 414, the color difference between the current frame's pixel and the same pixel from the preceding frame is calculated. In an actual embodiment of the invention, the color difference between each pixel is calculated by comparing the color difference between the two pixels determined in the manner represented by Equation (1) and described above. As will be readily understood, alternative color difference calculations are within the scope of the present invention. At block 416, a pixel block cumulative color difference is updated to reflect the calculated pixel color difference (block 414). At decision block 418, a test is made to determine whether the pixel is the last pixel in the pixel block. If it is not, the subroutine 400 returns to block 402 until the last pixel is processed. Alternatively, if the last pixel is processed, the subroutine 400 terminates at block 420.

Referring again to FIG. 3A and with reference to FIG. 3B, once the color mapping is complete for the pixel block at block 310, a test is made at decision block 312 to determine whether the pixel block is from the index frame. The index frame is the first frame of the digital image being processed. If the pixel block is part of the index frame, the routine proceeds to block 318 as will be described below. If the pixel block is not part of the index frame (block 312), at decision block 314 a test is made to determine whether the pixel block cumulative color differences (block 416 of FIG. 4) is above a threshold. If the pixel block cumulative color difference is below the threshold, the pixel block is determined to not have changed sufficiently from the previous frame to require an update of an image on the display 38. As illustrated at block 316, the pixel block color map is discarded and the routine 300 continues to block 324, which is described below. One skilled in the relevant art will appreciate that the value of the threshold utilized in decision block 316 is a function of the desired amount of accuracy of the display (in terms of reflecting any change in the frame) versus reduction of the size of the data required to generate each successive frame.

If at block 312 the pixel block is determined to be part of the index frame or if at block 314 the pixel block cumulative color difference is determined to be above the threshold, the color map data for the pixel block is run length encoded at block 318. As will be readily understood by those skilled in the art, run length encoding is a known encoding method and generally provides reduced data sizes if the data contains one or more strings of consecutive binary numbers (e.g., "000000000"). After completion of the run length encoding at block 318, at block 320, a test is made to determine whether the run length encoded file or the raw color indices file is larger. In this regard, it will be generally understood by those skilled in the art that run length encoding reduces the amount of data in a file for only certain types of files. Accordingly, if the run length encoded file is smaller, the run length encoded file is saved at block 324. Alternatively, if the raw color index file is smaller, the raw index file is saved at block 322. It is to be understood that alternative encoding methods could be substituted, or alternatively, added as additional options in choosing the smallest file.

If the cumulative pixel block color difference is not above the threshold (block 316) or after the pixel block has been saved (either block 324 or block 322), a cumulative frame data size value is increased according to the size of data required to represent the pixel block at block 326. As will be readily understood, if the pixel block is not saved (block 316), the pixel block's data equals zero and the cumulative frame data size will not increase.

Referring to FIG. 3C, at decision block 328, a test is made to determine whether the pixel block is the last block of the frame. If the pixel block is not the last block, the routine 300 returns to block 308 (FIG. 3A) and additional pixel blocks are processed. If the pixel block is the last block in the frame (block 328), a test is made to determine whether the cumulative frame data size is above a threshold value at decision block 330. The threshold utilized in decision block 330 determines the maximum file size allowed to represent the data for the frame. In an actual embodiment of the invention, the threshold is a variable that can be dependent on user input setting a desired size for the data files. Additionally, the threshold can be adjusted by the system as data is processed and as will be explained below. Alternatively, the threshold may be fixed.

If the cumulative frame data size is below the threshold, each compressed pixel block data is saved at block 336. If, however, the cumulative frame data size is above the threshold, the pixel block data is resaved, but in a low-resolution format. More specifically, the previously saved compressed pixel block data is discarded at block 332 and the entire frame is compressed in a low-resolution format at block 334. Alternatively, the video compression application may discard and resave only a portion of the pixel blocks in a low-resolution format.

Figure 5:
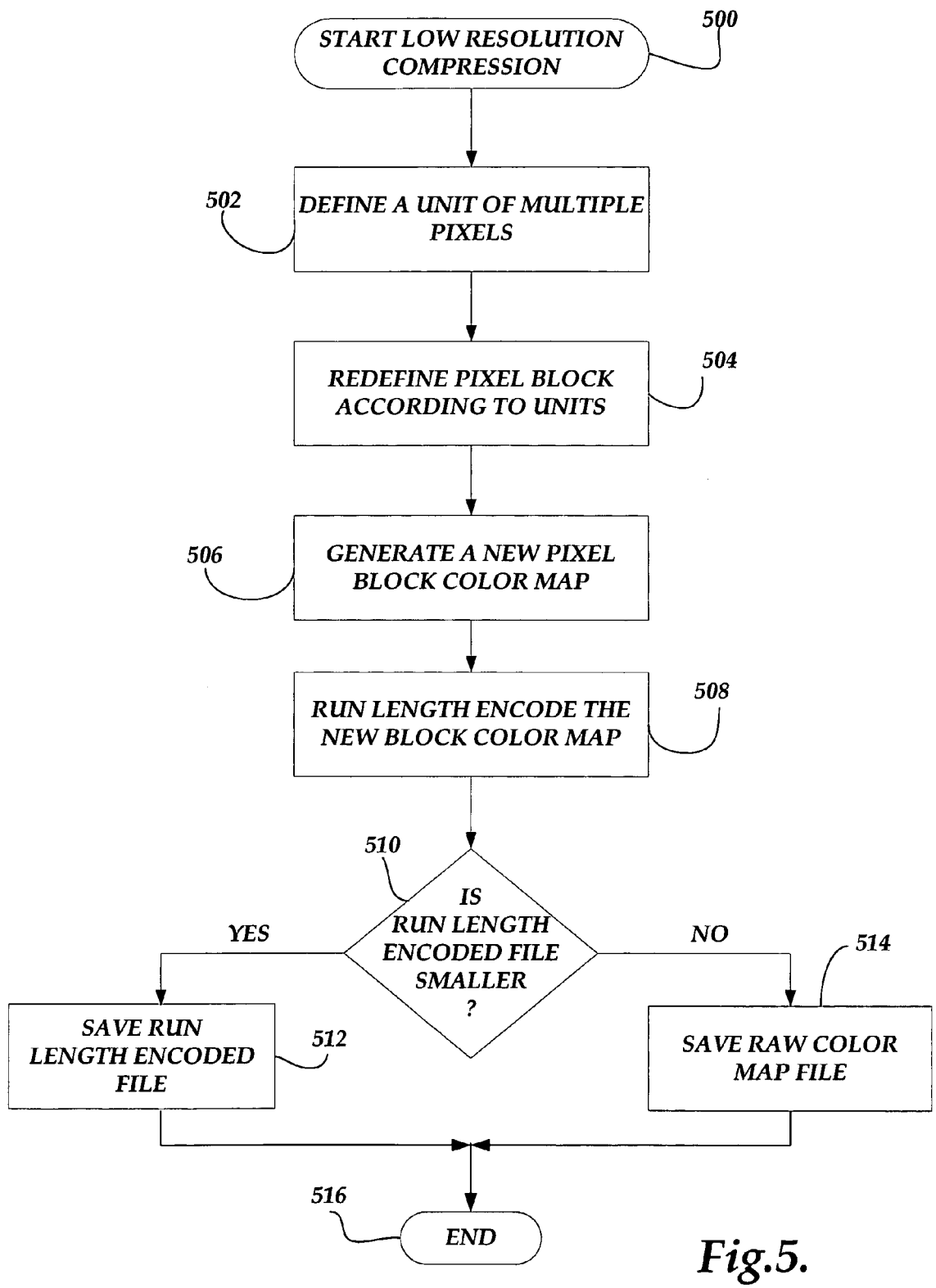
FIG. 5 is a flow diagram illustrative of a subroutine implemented by the image-processing computer of FIG. 2 for compressing video data in a low-resolution manner.

FIG. 5 is illustrative of a subroutine 500 for compressing data into a low-resolution format. At block 502, the video compression application 46 defines a predefined pixel area, such as a 4 pixel by 4 pixel area, as a single unit having identical color properties. At block 504, the pixel block is redefined by the units defined at block 502. In the actual embodiment of the invention referenced above, because the pixel block was previously defined by a 16 pixels by 16 pixels are, it would now be defined as 4 units by 4 units. At block 506, a color map is generated for the 4 unit by 4 unit pixel block. In an actual embodiment of the invention, the color map is generated in the manner illustrated in subroutine 400 of FIG. 4 except that the pixels of each 4 pixel unit are considered identical to one another. At block 508, the pixel block data is run length encoded. At decision block 510, a test is made to determine whether the run length encoded file or the raw color index file is smaller. If the run length encoded file is smaller the run length encoded file is saved at block 512. If the raw color index file is smaller, the raw color index file is saved at block 514. The subroutine 500 terminates at block 516. As will be readily understood, alternative low-resolution methods, or alternative grouping of units are within the scope of the present invention.

Returning to FIG. 3C, once the pixel block data has been saved at block 336 or block 334, the compression parameters are adjusted at block 338. In an actual embodiment of the invention, the video compression application 46 monitors the size of the data files being stored as a function of the video image resolution. This allows the thresholds utilized at decision blocks 314 and 330 to be automatically adjusted up or down. Moreover, in an actual embodiment of the invention, the video compression application 46 outputs the data size file on the image-processing computer 30 display 38. Accordingly, a user can determine whether the size of the data file is appropriate and whether the amount of resolution meets the user's desires. The display also allows the user to work with the automatic adjustment and reset the threshold levels.

Figure 6:
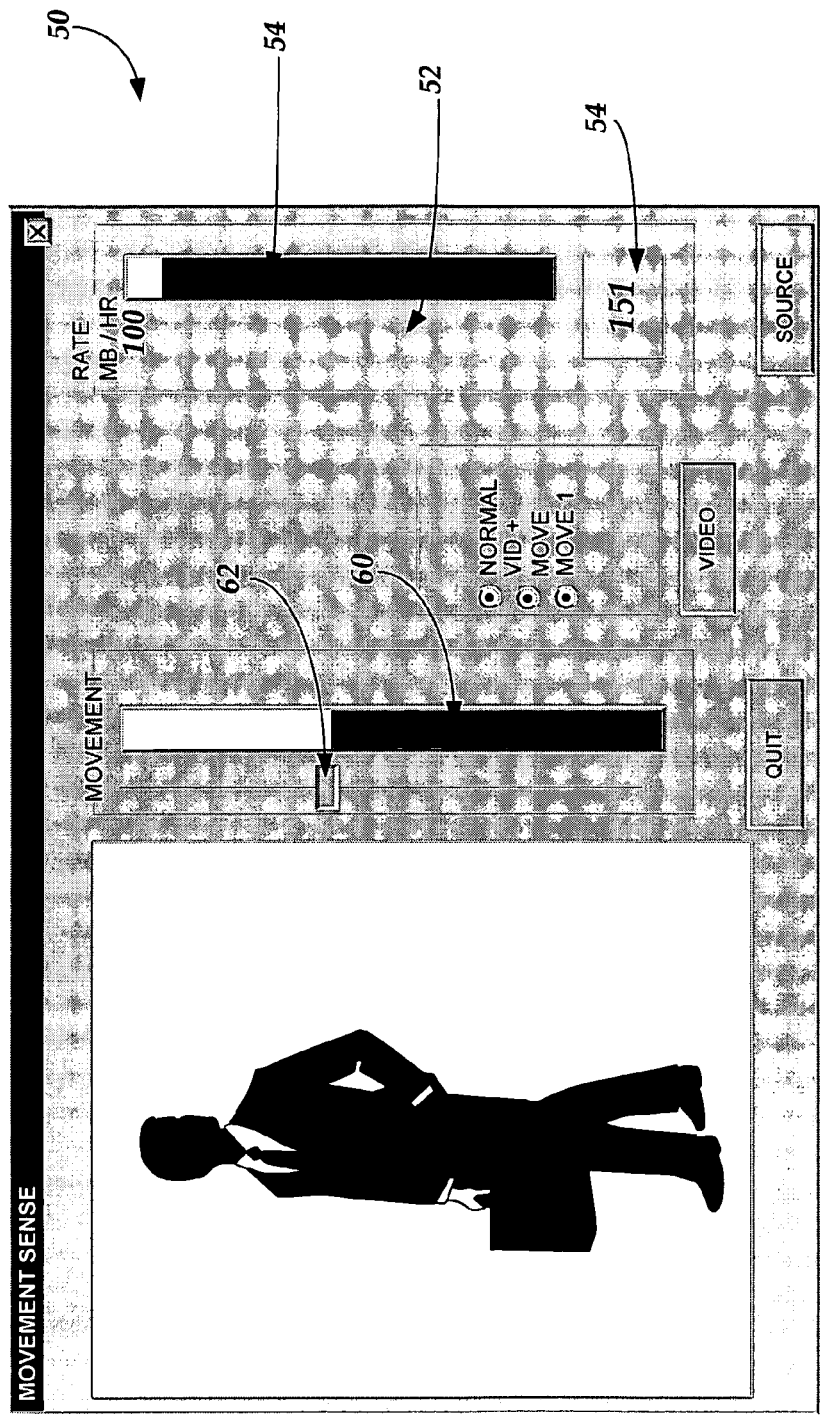
FIG. 6 is an exemplary illustration of a screen display generated by the image-processing computer of FIG. 2 for informing a user of the size of the data files being processed and for allowing the user to adjust the resolution of the image.

FIG. 6 is illustrative of screen display 50 generated by the image-processing computer 30 in accordance with the present invention. As illustrated in FIG. 6, the screen display 50 includes a data file size component 52 for displaying the size of the data frame files being stored. In an illustrative embodiment of the present invention, the data file size component 52 can include both graphical indicators 54 and textual indicators 56. The screen display 50 also includes a movement threshold indicator 58 for allowing a user to adjust the resolution of the movement detection. In an illustrative embodiment of the present invention, the movement threshold indicator 58 includes a graphical indicator 60 of the threshold and a user interface manipulation component 62 operable to allow a user to adjust the movement threshold. One skilled in the relevant art will appreciate that the screen display 50 may be varied and/or may include additional components than those illustrated in FIG. 6.

Returning to FIG. 3C, in an illustrative embodiment of the present invention, if the video compression application 46 determines that the data required to update successive frames is too large, the thresholds may be adjusted upward to reduce the size of the files. Alternatively, if only a few frames of data are of a large size, the video compression application 46 may process these files without adjusting the thresholds. In an illustrative embodiment of the present invention, the video compression application 46 may allow a limited number of larger size data blocks before adjusting the thresholds. The routine 300 then terminates at block 340.

In another aspect of the present invention, a method and system for displaying video data are provided. Specifically, in an illustrative embodiment of the present invention, a method and system for quantifying movement in synchronous video data according to a pseudocolor scale are provided.

Figure 7A:
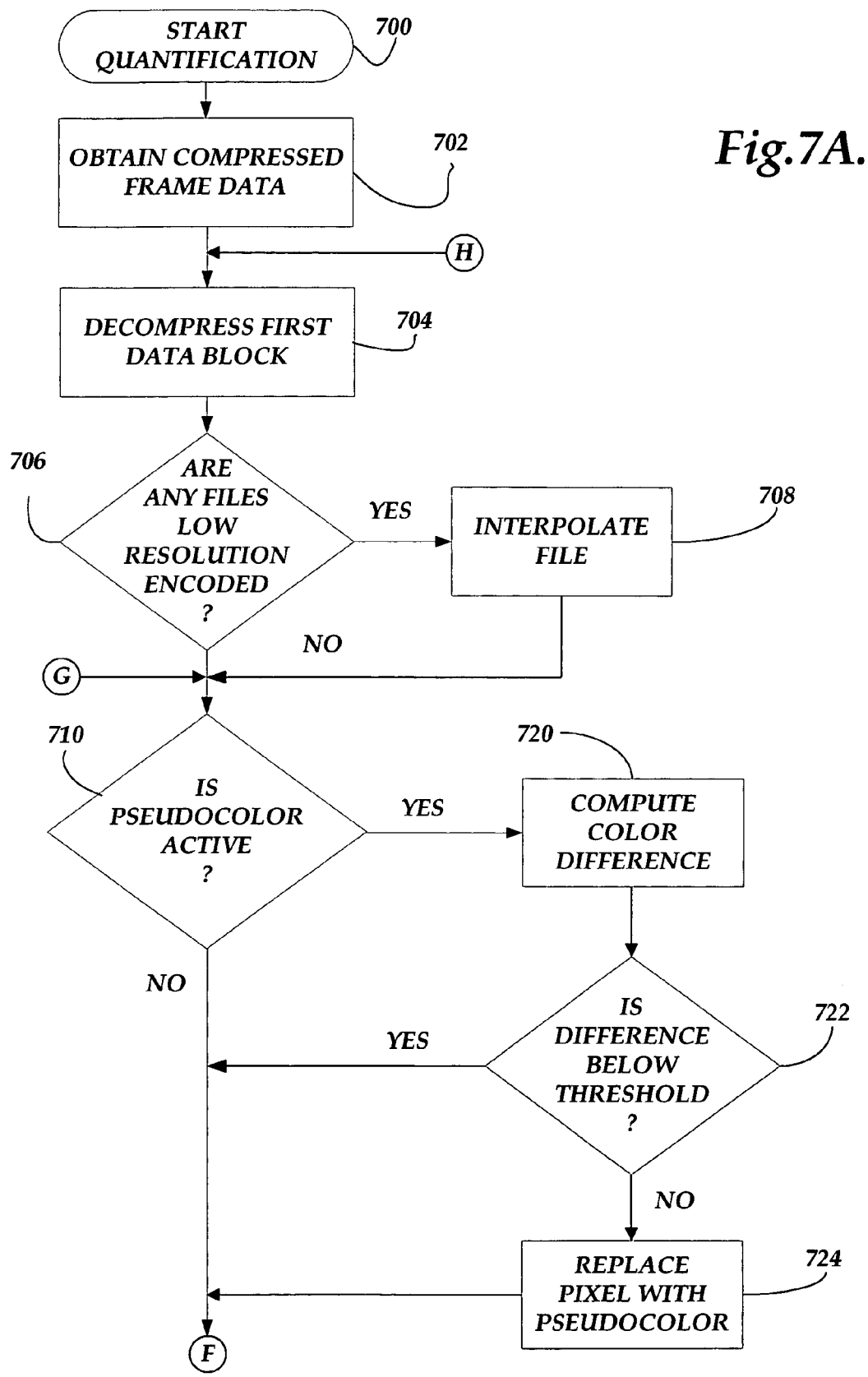
FIGS. 7A and 7B are flow diagrams illustrative of a routine implemented by the image-processing computer of FIG. 2 for decompressing and quantifying movement within a video image in accordance with the present invention.
Figure 7B:
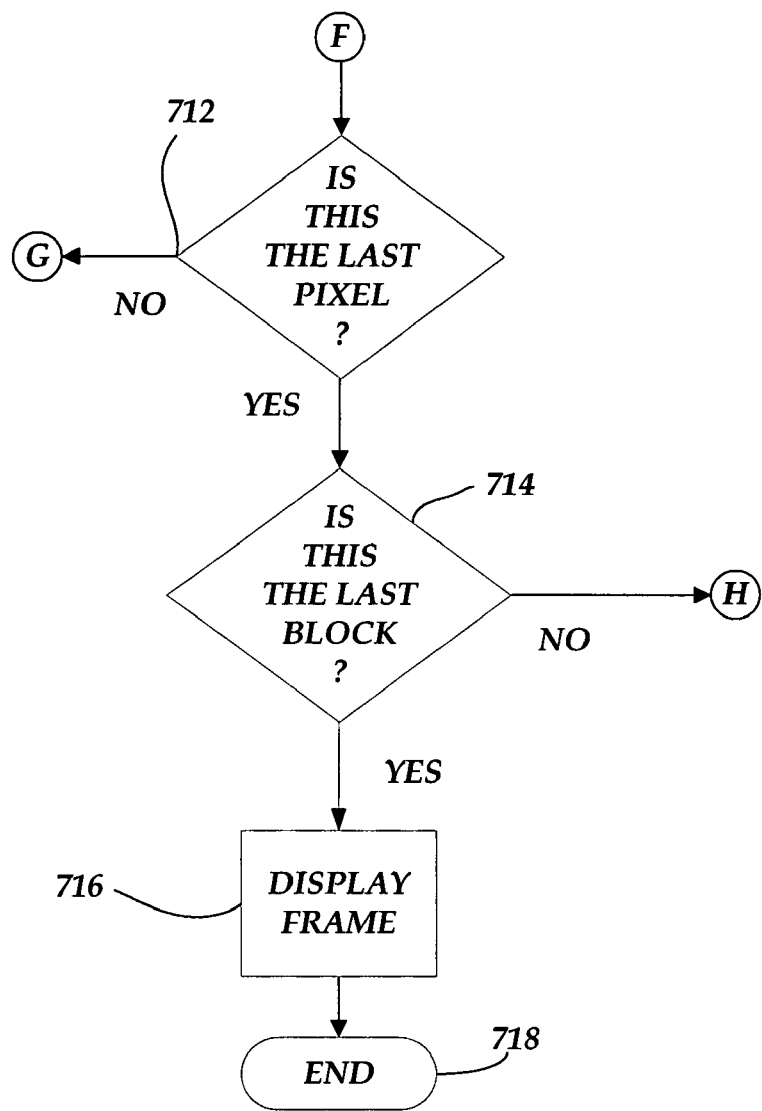

FIGS. 7A and 7B are illustrative of a routine 700 suitable for implementation by the video display application 48 of the image-processing computer 30 to display video display data compressed in the manner described above and illustrated as routine 300 in FIGS. 3A, 3B and 3C. With reference to FIG. 7A, at block 702 the video display application 48 obtains the compressed video data. The compressed data may be retrieved from the memory 42 of the image-processing computer 30 or may alternatively, be acquired via the Internet 20 or other communication medium. At block 704, a next pixel data block is decompressed. As will be generally understood by those skilled in the art, if the pixel data block was not run length encoded (or otherwise encoded) this step may be omitted. At decision block 706, a test is made to determine whether the pixel data block was encoded in a low-resolution format (block 334 of FIG. 3C). If so, the data is interpolated at block 708 to generate a 16 pixel by 16 pixel data block. Since the interpolation of low-resolution encoded data is generally known to those skilled in the art, it is not described here.

If the data was not compressed in a low-resolution format or once the data has been interpolated at block 708, a test is made at block 710 to determine whether the video display application 46 is to quantify and display movement as pseudocolor on the image-processing computer display 38. With reference to FIG. 7B, if the pseudocolor feature is not active, the routine 700 progresses to decision block 712 to test whether the pixel being processed is the last pixel of the pixel block. If the pixel is not the last pixel in the pixel block, the routine 700 returns to block 710 (FIG. 7A). If is it the last pixel in the pixel block, at decision block 714, a test is made to determine whether the current pixel block is the last block of the frame. If it is not the last block in the frame, the process 700 returns to block 704 (FIG. 7A) to process the remaining pixel blocks. If the current pixel block is the last block of the frame, the frame is displayed at block 716 and the routine 700 terminates at block 718.

Returning to decision block 710 (FIG. 7A), if the pseudocolor feature is active, the color difference between the pixel in the pixel block and the identical pixel in the preceding frame is calculated at block 720. As explained above with reference to block 412 of FIG. 4, in an actual embodiment, the calculation of color difference in between pixels can be defined by Equation (1):

$$RGB_\Delta = \text{absolute}(red_{pixel} - red_{map}) + \text{absolute}(green_{pixel} - green_{map}) + \text{absolute}(blue_{pixel} - blue_{map}) \quad (1)$$

At decision block 722, a test is made to determine whether the color difference calculated at block 720 is below a threshold value. If it is below the threshold value, the two pixels are sufficiently the same (implying little or no movement) and the routine 700 proceeds to block 712 (FIG. 7B). In an alternative embodiment of the invention, if the pixel color difference is below the threshold, the pixel is assigned a gray or grayscale value to accentuate color differences in other pixels.

If at block 722 the color difference is above the threshold, the pixel's color is replaced with a pseudocolor at block 724. In an actual embodiment of the invention, pseudocolor is assigned from a range of colors corresponding to a numerical range of potential color differences between pixel colors. For example, there are 32 possible color representations for each pixel utilizing a 5-bit color representation. Accordingly, the largest numeric difference between any two colors (color 0 and color 31) would be 31. In a three-color bitmap configuration, the largest cumulative difference would be 31 times 3 or 93 numeric units. Accordingly, a different color in the pseudocolor scale corresponds to one of the 93 possible numeric unit differences. In an illustrative embodiment of the invention, the larger unit differences are set to correspond to more pronounced pseudocolors, thereby accentuating a pixel when it has a larger color difference than the same pixel in the preceding frame. As will be generally understood, any number of specific color and unit ranges can be utilized in accordance with the present invention.

Upon assigning the pixel a pseudocolor at block 724, the routine 700 continues to decision block 712 (FIG. 7B) which returns the process to block 710 until each pixel in the pixel block has been processed. Once each pixel in the pixel block has been processed, decision block 714 returns the process to block 704 until each pixel block in the frame has been processed. Once the last pixel block is processed, the corresponding frame is displayed at block 716 and the routine 700 terminates at block 718.

FIG. 8 is an enlarged view of a screen display 64 similar to the screen display 50 of FIG. 6 illustrating a pseudocolor display generated by the video display application 48 of the image-processing computer 30. As illustrated in FIG. 8, the screen display 64 includes a window 66 for displaying frames of the digital data. As an illustrative embodiment of the present invention, the window 66 displays a first portion 68 of a digital image in a grayscale. The first portion corresponds to sections of the frame data not having movement above the movement threshold. The window 66 also displays a second portion 70 of the digital map in various pseudocolors. The second portion 70 corresponds to one or more sections of the frame data that has movement above the movement threshold. One skilled in the relevant art will appreciate that any one of a variety of color schemes may be utilized to represent movement in accordance with the present invention. Moreover, one skilled in the art will further appreciate that screen displays 50 and 64 may be combined into a single user interface or a series of user interfaces.

The present invention facilitates the processing of video display data detecting movement over long time period by having a variable data rate. During periods of inactivity, the pixels remain relatively unchanged and the data rate may fall to as low as zero. During periods of more movement, the present invention saves the movement data on a pixel block basis while limiting the maximum size the data can be. Additionally, the present invention also adjusts the variable parameters of the system to account for consecutive periods of increased movement or user preferences.

The present invention also facilitates the quantitative measurement of movement within the video frame. By computing the color difference on a per pixel basis, the present invention assigns a variable pseudocolor to each pixel dependent on the amount the pixel has changed from the previous frame. As such, areas of higher movement, reflected by a larger color difference between the current pixel and the preceding pixel, are represented by a different color than areas of lower movement, having a lower color difference. Thus, a user detects and quantifies movement visually on the image-processing computer 30 display 38.

While an illustrative embodiment of the invention has been illustrated and described, it will be appreciated that various changes can be made therein without departing from the spirit and scope of the invention.

The invention claimed is:

1. A method for processing movement data in synchronous video, the method comprising:
   obtaining a first frame of digital data corresponding to a digital image;
   generating a color-table for the first frame of the digital data, the color-table corresponding to at least one pixel color contained within the first frame;
   mapping the first frame of digital data according to the color-table;
   obtaining a preceding frame of digital data corresponding to the digital image;
   representing a cumulative color difference between the first and the preceding frames of the digital data in a pseudocolor, wherein the pseudocolor is configured to map cumulative color differences below a movement threshold in a grayscale and cumulative color differences above the movement threshold in at least one distinct color; and
   updating a frame data with the pseudocolor if the cumulative difference is above a difference threshold, wherein the frame data is operable to regenerate the first frame of the digital data.

2. The method as recited in claim 1, wherein the preceding frame of digital data is previously mapped with a color-table corresponding to at least one pixel color contained within the preceding frame.

3. The method as recited in claim 1, wherein the first frame is a bitmap image, the method further comprising truncating at least one bit of the first frame bitmap prior to generating the color-table.

4. The method as recited in claim 3, wherein truncating at least one bit of the first frame includes truncating the three least significant bits of the bitmap image.

5. The method as recited in claim 1, wherein the color-table includes up to sixteen colors contained within the first frame.

6. The method as recited in claim 1 further comprising encoding the first frame color mapping if the size of the resulting encoded color mapping is less than the size of an unencoded color mapping.

7. The method as recited in claim 1, wherein mapping the first frame includes:
   subdividing the first frame of the digital data into two or more pixel blocks; and
   mapping a first pixel block according to the color table.

8. The method as recited in claim 7 further comprising repeating the method for a second pixel block.

9. The method as recited in claim 1, wherein generating a color-table includes randomly sampling individual pixels within the first frame of the digital data to obtain at least one color in the color table.

10. The method as recited in claim 1, wherein generating a color-table includes retrieving a predefined color-table.

11. The method as recited in claim 1 further comprising discarding the frame data if a size of the frame data is greater than a size threshold.

12. The method as recited in claim 11, further comprising:
   compressing the first frame of the digital data utilizing a low resolution compression process; and
   adjusting the difference threshold.

13. A computer-readable medium having computer-executable instructions for performing the method recited in any one of claims 1–12.

14. A computer system having a processor, a memory, and an operating environment, the computer system operable for performing the method recited in any one of claims 1–12.

15. A method for processing movement data in synchronous video, the method comprising:
  obtaining a first frame of digital data;
  obtaining a second frame of digital data, where the second frame of digital data is representative of a time preceding the first frame of digital data;
  comparing the cumulative color difference between the first and second frames of digital data;
  mapping the cumulative color difference according to a pseudocolor scale, wherein the pseudocolor scale is configured to map cumulative color differences below a movement threshold in a grayscale and cumulative color differences above the movement threshold in at least one distinct color; and
  displaying a resulting frame of digital data.

16. The method as recited in claim 15, wherein comparing the cumulative color difference includes:
  obtaining a first pixel block from the first frame of digital data;
  obtaining a first pixel block from the second frame of digital data; and
  comparing the cumulative color difference between the first pixel block from the first frame of digital data and the second frame of digital data.

17. The method as recited in claim 16, wherein comparing the cumulative color difference between the pixel block data includes comparing the color difference for each pixel in the pixel block data.

18. The method as recited in claim 16 further comprising:
  obtaining additional pixel blocks from the first and second frames of digital data;
  comparing the cumulative color difference for each additional pixel block; and
  repeating the comparison until no pixel blocks remain in the first and second frames of digital data.

19. The method as recited in claim 15, wherein the first and second frames of digital data are compressed, the method further comprising uncompressing the first and second frames of digital data prior to comparing the cumulative color difference between the first and second frames of digital data.

20. The method as recited in claim 19, wherein the frames of digital data are compressed utilizing a high resolution routine.

21. The method as recited in claim 15, wherein the pseudocolor is configured to map cumulative color differences above the movement threshold in several distinct colors, wherein each distinct color is representative of a range of cumulative color differences.

22. A computer-readable medium having computer-executable instructions for performing the method recited in any one of claims 15–20 and 21.

23. A computer system having a processor, a memory and an operating environment, the computer system operable to perform the method recited in any one of claims 15–20 and 21.

24. A computer-readable medium having computer-executable modules, the computer-readable medium comprising a synchronous video compression module operable to obtain a first and second frame of digital data and generate a compressed frame data, wherein the compressed frame data is configured to include any cumulative color difference below a compression threshold in a pseudocolor, wherein the pseudocolor is configured to map cumulative color differences below a movement threshold in a grayscale and cumulative color differences above the movement threshold in at least one distinct color.

25. The computer-readable medium as recited in claim 24, further comprising a synchronous video processing module operable to obtain a first and second frame of digital data and generate a processed frame data, wherein the processed frame data is configured to map any cumulative color difference according to a pseudocolor scale, wherein the pseudocolor scale is configured to map cumulative color differences below a movement threshold in a grayscale and cumulative color differences above the movement threshold in at least one distinct color.

26. A method for processing movement data in synchronous video, the method comprising:
  obtaining a first frame of digital data corresponding to a digital image;
  subdividing the first frame of the digital data into two or more pixel blocks;
  generating a color table for each pixel block in the first frame of the digital data, the color table corresponding to at least one color contained within each pixel block;
  mapping each pixel within the pixel block according to the color table;
  obtaining a preceding frame of digital data corresponding to the digital image;
  representing a cumulative color difference between each pixel block in the first frame of data and a pixel block in the preceding frame of the digital data in a pseudocolor, wherein the pseudocolor is configured to map cumulative color differences below a movement threshold in a grayscale and cumulative color differences above the movement threshold in at least one distinct color; and
  updating a frame data if the cumulative color difference between each pixel block is above a different threshold, wherein the frame data is operable to regenerate the first frame of the digital data.

27. The method as recited in claim 26, wherein the preceding frame of the digital data is mapped with a color table corresponding to at least one color contained within the preceding frame.

28. The method as recited in claim 26, wherein the first digital frame is a bitmap image, the method further comprising truncating at least one bit of the first frame bitmap prior to generating the color table.

29. The method as recited in claim 28, wherein truncating at least one bit of the first frame includes truncating three least significant bits of the bitmap image.

30. The method as recited in claim 26, wherein the color table includes up to sixteen colors contained within each pixel block.

31. The method as recited in claim 26, wherein generating a color table includes randomly sampling individual pixels within each pixel block of the digital data to obtain at least one color in the color table.

32. A computer-readable medium having computer-executable instructions for performing the method recited in any one of claims 26–31.

33. A computer system having a processor, a memory, and an operating environment, the computer system operable to perform the method recited in any one of claims 26–31.

* * * * *